US008085445B2

(12) United States Patent
Brown

(10) Patent No.: US 8,085,445 B2
(45) Date of Patent: Dec. 27, 2011

(54) METHOD TO CERTIFY FACSIMILE TRANSMISSIONS

(75) Inventor: Mark D. Brown, Saint Paul, MN (US)

(73) Assignee: RedPhone Security, Inc., St. Paul, MN (US)

( * ) Notice: Subject to any disclaimer, the term of this patent is extended or adjusted under 35 U.S.C. 154(b) by 812 days.

(21) Appl. No.: 12/088,393

(22) PCT Filed: Oct. 26, 2006

(86) PCT No.: PCT/US2006/041788
§ 371 (c)(1),
(2), (4) Date: Aug. 6, 2008

(87) PCT Pub. No.: WO2007/053420
PCT Pub. Date: May 10, 2007

(65) Prior Publication Data
US 2009/0015876 A1    Jan. 15, 2009

Related U.S. Application Data

(60) Provisional application No. 60/731,147, filed on Oct. 28, 2005.

(51) Int. Cl.
*H04N 1/04* (2006.01)
(52) U.S. Cl. ......... 358/405; 358/434; 358/400; 358/402
(58) Field of Classification Search ........... 358/405, 358/434, 400, 402, 407
See application file for complete search history.

(56) References Cited

U.S. PATENT DOCUMENTS

| 5,940,187 | A | * | 8/1999 | Berke | 358/434 |
| 7,430,714 | B1 | * | 9/2008 | Savitzky et al. | 715/255 |
| 2002/0080417 | A1 | * | 6/2002 | Quine | 358/407 |
| 2003/0090734 | A1 | | 5/2003 | Lapstun et al. | |
| 2004/0078337 | A1 | * | 4/2004 | King et al. | 705/51 |
| 2004/0212828 | A1 | * | 10/2004 | Peled et al. | 358/1.15 |
| 2005/0094183 | A1 | * | 5/2005 | Kojima | 358/1.14 |
| 2005/0225791 | A1 | * | 10/2005 | Lee | 358/1.14 |

OTHER PUBLICATIONS

PCT International Preliminary Report on Patentability from corresponding PCT Application No. PCT/US2006/041788, mailed May 8, 2008, (8 pages).
PCT International Search Report and Written Opinion from corresponding PCT Application No. PCT/US2006/041788, mailed Jan. 15, 2008, (12 pages).

* cited by examiner

*Primary Examiner* — Houshang Safaipour
(74) *Attorney, Agent, or Firm* — Shumaker & Sieffert, P.A.

(57) ABSTRACT

The invention is directed to techniques of facilitating document transmission from one entity through an electronic communications network. An entity may be a legally recognized person such as a corporation, partnership, organization, government, individual, and the like. As a legally recognized person, an entity may act as a principal with respect to one or more authorized agents. Furthermore, as a legal person, an entity may authorize one or more of its agents to use fax transmission equipment such as the fax certification system described herein. The techniques of this invention assure a second entity that a first entity has indeed authorized its agent to send a document from a fax station under the controls of the first entity.

25 Claims, 2 Drawing Sheets

METHOD TO CERTIFY FACSIMILE TRANSMISSIONS

TECHNICAL FIELD

The invention pertains to the field of facsimile document transmission.

SUMMARY

In general, the invention is directed to techniques of facilitating document transmission from one entity through an electronic communications network. An entity may be a legally recognized person such as a corporation, partnership, organization, government, individual, and the like. As a legally recognized person, an entity may act as a principal with respect to one or more authorized agents. Furthermore, as a legal person, an entity may authorize one or more of its agents to use fax transmission equipment such as the fax certification system described herein. The techniques of this invention assure a second entity that a first entity has indeed authorized its agent to send a document from a fax station under the controls of the first entity.

In one embodiment, the invention is directed to a method. The method comprises authenticating an entity's agent before certifying an outbound fax transmission. The method further comprises creating evidence of the agent's authentication and of that entity's assertion of relationship to the agent, of creating a visual representation of this evidence that resists forgery and similar attacks, and of transmitting the fax in a manner that indelibly associates its document contents with both visual and cryptographic representations of this evidence.

In another embodiment, the invention provides a method comprising authenticating a sender of a facsimile transmission to be sent, generating a graphical signature for the facsimile transmission, and generating the facsimile transmission to include the graphical signature.

In another embodiment, the invention provides a method comprising receiving a facsimile transmission, the facsimile transmission including a cover sheet, a digital signature and a graphical signature, and authenticating the facsimile transmission based on the cover sheet, the digital signature, the graphical signature, and a public key certificate.

The invention may be embodied in hardware, software, firmware, or any combination thereof. For software implemented examples, the invention may be directed to a computer readable medium that stores instructions that upon execution cause a facsimile machine (or a computer associated therewith) to perform the techniques described herein.

The following steps may describe one embodiment of the invention taken to reduce the risk of unauthorized actions upon fax communications:

1) Emit a "cover sheet" containing digital signature values for each certified fax transmission, prepending this "cover sheet" to the requested facsimile document transmission.
2) Require persons requesting a certified fax transmission to first successfully complete a computer or network authentication in the context of the sending entity before allowing the invention to emit the "cover sheet"
3) Slightly alter the facsimile transmission by introducing a "watermark"overlay pattern to each page of the facsimile transmission
4) Utilize public key cryptography to produce digital signature evidence showing that both the slightly altered and "watermarked" facsimile transmission and the isolated "watermark" pattern were both originated by the Sender. Incorporate these digital signature values into the "cover sheet" as mentioned in (1) above.

Over all of these steps, the system provides a mechanism to ensure that these steps were taken in a reliable manner.

DETAILED DESCRIPTION

Figure 1:
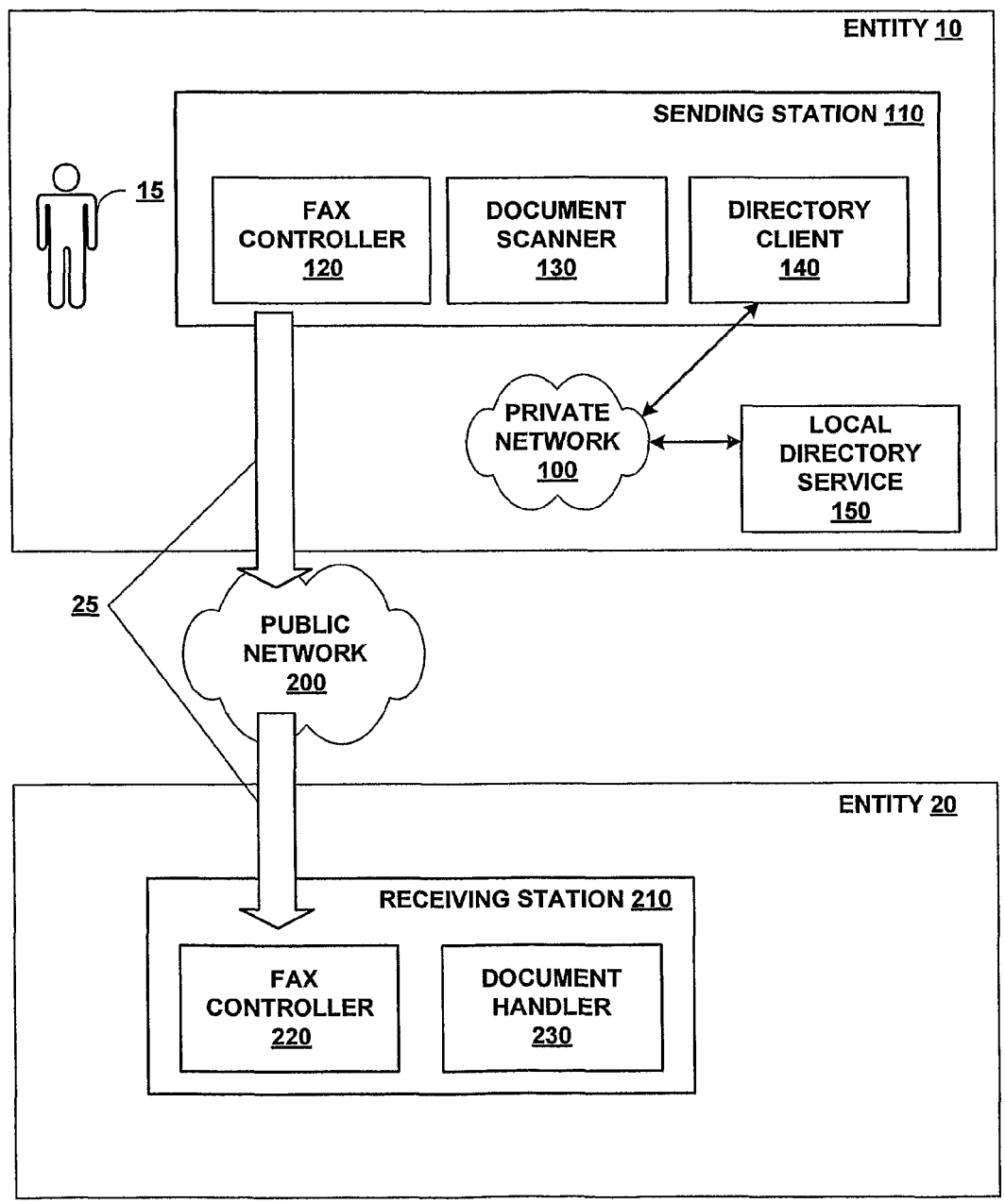
FIG. 1 is a block diagram illustrating an exemplary facsimile certification system in which an entity is using a private network.

It is common in the course of business today to use a facsimile (fax) machine to transmit documents from one party to another. Parties that use a fax for electronic transmission of documents speed the execution of contracts between parties, speed the delivery of time sensitive documents, or otherwise quicken many common business processes. Such use of fax transmission improve convenience, reduce operating costs, improve service levels, or provide other benefits to parties. Typically the costs associated with operating a fax are primarily incremental based on the level of use, and most parties today consider fax a low cost mechanism to achieve the business benefits listed above.

Fax machines that are popularly used and widely deployed today follow a standard method of operation. They convert paper documents to digitally scanned images and transmit these images from one fax station to another fax station. Typically fax stations communicate these images from point to point using "plain old telephone standard" (POTS) telephone lines. The fax transmission standards popularly used today predate many current cryptographic standards and make little or no provision for utilizing encryption methods to secure the transmission. As a result, transmission using the fax standards are generally considered unprotected against threats of unauthorized disclosure, tampering, repudiation and forgery.

Forgery is an especially relevant security threat against standard fax because the fax operates by converting paper documents to electronic transmissions. A majority of today's most effective tangible document security features, including watermarks, holograms, microprinting, embedded security markers and devices, patterns of dots and color, etc., are designed to be impossible to reproduce using a document scanner such as those used by a fax machine. Faxing a tangible document that uses effective security features therefore strips away measures intended to prevent forgery and renders the fax transmission contents in a way that looks very similar to—or identical to—a forgery. Furthermore, while fax machines by convention transmit a station identifier that is typically derived from the telephone number of the sending fax, no security measures in the fax standard can prevent forgery of this station identifier. Because nearly all fax machines honor this convention, people who receive faxes in some cases come to rely on the fax station identifier as proof of authenticity of the sender. Despite the person's felt need for such sender authentication, which may tend to reinforce habits of relying on the station identifier, the fax station identifier may be easily forged.

Despite the security risks associated with standard fax transmissions, in some cases sensitive documents may be sent from a fax station. In such cases it would be desirable to the Receiver to have the ability to receive authentication evidence that the facsimile originated from the Sender, and that it was originated by an agent of the Sender. Both Sender and Receiver benefit from obtaining evidence that the facsimile transmission was not altered during or after transmission. Further, it would be desirable to the Sender to prevent unauthorized persons from using that station to send facsimiles purporting to carry out official business, or from unnoticeably inserting unauthorized pages into a transmission, or from otherwise unnoticeably tampering with the contents of a facsimile transmission. The invention provides these benefits by introducing a method of electronically and visually certifying facsimile transmissions in a way that resists forgeries, repudiation and tampering while maintaining compatibility with conventional fax receiving stations.

FIG. 1 is a block diagram illustrating an embodiment of a facsimile certification system in sending station 110. Sending station 110 transmits an enhanced facsimile document 25 from entity 10 to entity 20. Entities 10 and 20 communicate facsimiles using public network 200, which may be a plain standard telephone network or any other type of computer network capable of transmitting conventional facsimiles. Entities 10 and 20 represent any entity, family, organization, enterprise, company, business, corporation, or any legally defined enterprise that authenticates one or more agents using one of sending station 110 or private network 100. Entity 4 contains at least one agent 15. Agent 15 may represent an employee, contractor, software program, family member, constituent, and so on.

Sending station 110 integrates the operation of a facsimile (fax) controller 120 and a fax machine document scanner 130 with a directory client 140. Directory client 140 and local directory service 150 may both participate in private network 100. Private network 100 may be trusted by entity 10 to securely communicate queries from directory client 140 to local directory service 150, and to securely communicate responses in reply. Private network 100 may use a system such as the Massachusetts Institute of Technology's Kerberos to secure the communications between directory client 140 and local directory service 150. Alternatively, directory client 140 and local directory service 150 may both reside within sending station 110, in which case private network 100 may be trivial or nonexistent. Directory client 140 may contain a specialized credential input device, such as a smart card reader, fingerprint reader, password keyboard, PIN code reader, etc. Directory client 140 authenticates users such as agent 15 by submitting the user's credentials supplied during the authentication process to local directory server 150. It reports success or failure to sending station 110 upon receiving an authentication response from local directory server 150.

Fax controller 120 allows the user to specify a recipient's fax telephone number. Fax controller 120 may have a numeric keypad suitable for its user to enter a recipient's fax telephone number, and may also have a display or other user interface. Fax controller 120 may alternatively be software executed on a general purpose computer such as a personal computer or laptop computer, in which case a larger keyboard and monitor may be employed. Methods to specify the fax telephone number may include a directory of persons and other named recipients, which could be specified in order to derive the fax telephone number or other unique station identifier used to route the fax to the intended recipient. Using a directory, agent 15 may use an input device such as an alphabetic keyboard to enter search criteria for recipient names, or an input device such as a dial with which to scroll through the directory of names, etc. Other types of fax controllers may also be used, including fax controllers capable of receiving network messages containing instructions that specify a recipient's or recipients' fax telephone numbers. In addition entering the fax telephone number, the user may also ready the original document for consumption by the fax controller 120. The original document may be a paper document fed into document scanner 130, or it may be an electronic document rendered into a standard fax electronic format. Next the user may indicate to the sending station 110 that it should begin processing. Sending station 110 then commences its transmission processing, performing actions such as: acquire the original document in a fax format, dial the fax telephone number the user has entered, determine if a fax machine has answered that telephone call, transmit the scanned version of the paper document, and perform error handling or correction as required.

Sending station 110 processes and enhances a scanned version of an original document if and only if the user can provide sufficient authentication of himself or herself. If the user indicates to sending station 110 that it should send the fax using a certified transmission, sending station 110 instructs directory client 140 to authenticate agent 15. Upon authentication of the fax certification system's user sending station 110 performs processing and enhances the images of the scanned document as described in FIG. 2 below before transmitting the fax to entity 20.

Entity 20 contains at least one fax receiving station 210. Station 210 is connected to public network 200, for example, with a telephone line and fax telephone number. Station 210 contains a fax controller 220 capable of answering telephone calls, or otherwise receiving fax messages from public network 200. Station 210 may contain a document handler such as a printer, fax to email bridge server, or fax document storage system, etc.

Figure 2:
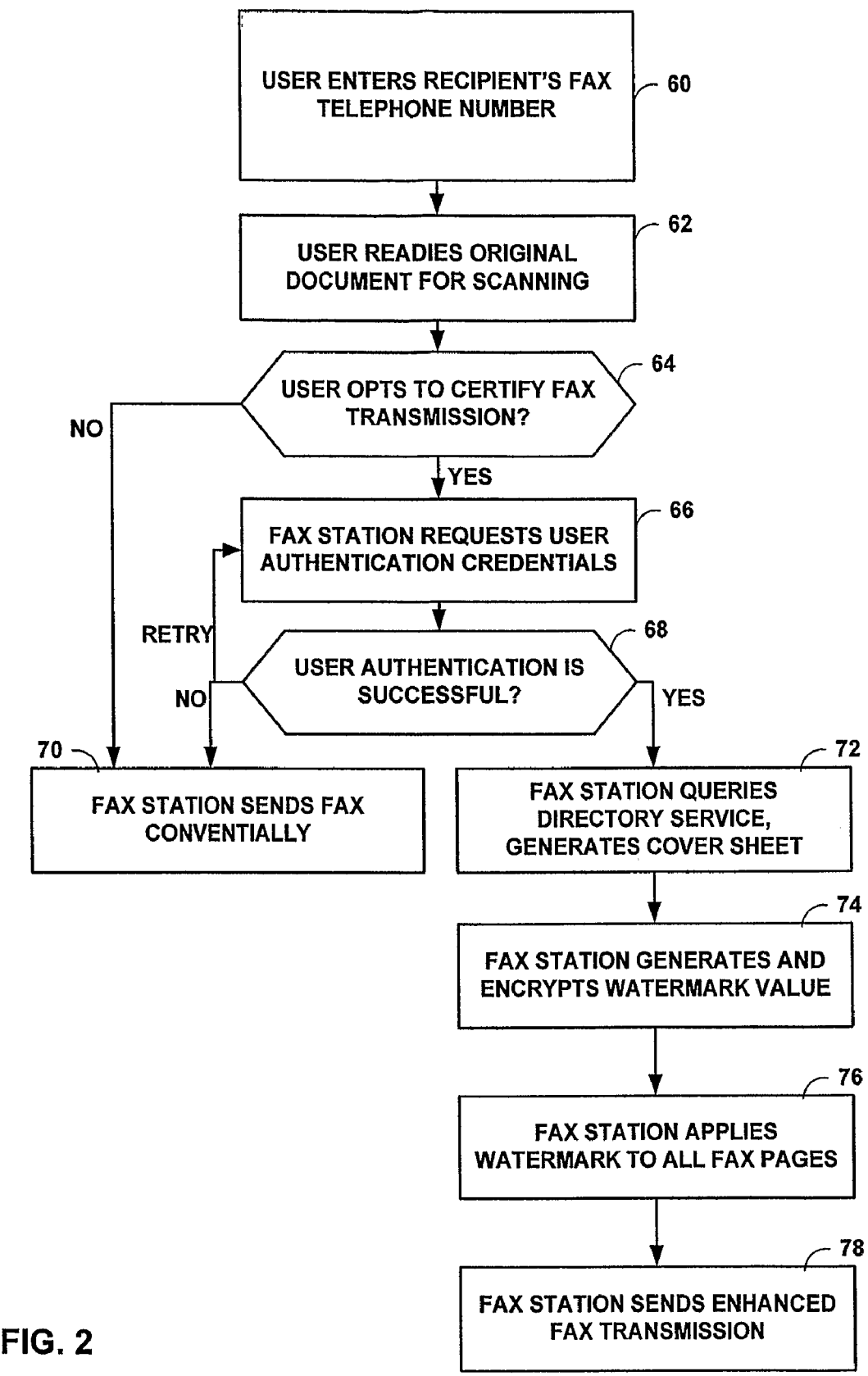
FIG. 2 is a flowchart illustrating an exemplary series of steps used to send a certified facsimile to a receiving station.

FIG. 2 is a flowchart illustrating the exemplary process by which the fax certification system sends an enhanced and certified fax transmission. Initially (60) agent 15 as the user of the sending station 110 provides a recipient's fax telephone number or other station identifier appropriate to public network 200 to sending station 110. Next (62) agent 15 provides a document for the document scanner 130, which it may in turn prepare to convert to a fax-compatible format if required. Relative to the facsimile copy of this document, the document that agent 15 provides is the original document, even though this document may itself be copied or otherwise derived from some other document.

If agent 15 has not opted to certify this fax transmission, then the fax station does not perform processing to send an enhanced fax and instead it transmits (70) the fax to entity 20's receiving station 210. On the other hand, if agent 15 has affirmatively opted to certify this fax transmission (64) then the fax sending station 110 instructs directory client 140 to request credentials from agent 15 (66). Once agent 15 has provided credentials to directory client 140 of sending station 110, those credentials are validated (68) against the record of agent 15's credentials stored by entity 10 in local directory service 150 in order to authenticate agent 15. Entity 10 is solely responsible for configuring local directory service 150 to authenticate its agents to its satisfaction, including any one or more of: configuring the directory service 150 to expire credentials over time, check against revoked credentials, to stored the credentials securely, to audit credentials, etc. If local directory service 150 cannot authenticate the user's credentials, it may allow the user to retry by requesting the user's credentials again, it may cancel the fax operation (not shown), or it may transmit the fax conventionally. In addition, either directory client 140 or local directory service 150 may optionally log the failure or perform a security operation to respond to the failed authentication attempt.

If agent 15 successfully authenticates then the sending station begins its processing to enhance the fax images and to generate a cover sheet for the fax. Sending station 110 retrieves a fax cover sheet template consisting of formatting instructions and a list of data fields required or desired by entity 10 to be computed and then inserted into the cover sheet template. The formatting instructions may be prepared in any of a wide variety of text formatting languages or conventions, examples of which include Hypertext Markup Language, Rich Text Format, eXtensible Markup Language, extensible Stylesheet Language Transformation, Cascading Style Sheets, etc., and combinations of these. In order to obtain the values for the specified data fields, directory client 140 may query local directory service 150 for additional information related to the authenticated user corresponding to agent 15 (72), and for any additional information specified by entity 10 contained in the local directory 150. Sending station 110 may also format the current date and time and perform similar trivial computer operations and queries to obtain values for the specified template fields.

The cover sheet may include the following data fields: the sender's name (in the spelling, language, format preferred by the organization that authenticated the sender); the fax telephone number of the facsimile station sending the document, and/or the sender's facsimile station identifier, whichever is unique and preferred within the organization that authenticated the sender; the name of the organization that authenticated the sender; a unique identifier and/or instructions for obtaining a copy of the public key certificate used to create digital signatures for this transmission; the recipient's fax telephone number; the sender's facsimile station's current date and time value; a count of pages in the transmission, counting this facsimile cover sheet, beginning with page number 1. When these data fields are included in the facsimile cover sheet they may be formatted using fonts, typefaces, etc., and embedded into a cover sheet template including graphics such as a graphical letterhead, annotations of the data fields, ruler lines, additional verbiage such as legal statements, etc. All of these may be configured by the organization using the system of the invention without altering the system of the invention's methods to obtain. In addition, that same organization may opt to configure the invention to send additional data fields in the cover sheet populated, such as the sender's telephone number or email address, or other data fields related to either the sender or the organization. Additional data fields that may be configured if desired include: recipient's name; address of sender or recipient or both; additional contact information; etc. Upon obtaining all required and desired data field values and inserting those values into the placeholders in the cover sheet template, the cover sheet is inserted as the first page in the document to be transmitted, ahead of all other pages in the document, Three exceptions are the watermark data field value, the overall document digest value and the overall document signature value, for which placeholders will remain but whose values have not yet been computed.

Next the fax station 110 generates the fax watermark value. The fax watermark value is a random value that should be unique or at least un-guessable in its randomness for each fax transmission sent by sending station 110. This characteristic of the digital fax watermark is different from a paper-based watermark, which typically uses a graphic, logo or image that is the same for all watermarked pages. A paper-based watermark may be expensive to duplicate and thereby deter unauthorized duplication. A digital watermark suitable for fax transmission can be easily and inexpensively duplicated, therefore the deterrent provided by using the watermark method described in this disclosure is achieved by creating a high level of difficulty in guessing or forging what the watermark should be, given the forger's choice of fraudulent original document. An additional advantage offered by the digital fax watermark method described below is that it allows the sender but only the sender to identify which of its users (or agents) authenticated to the sending station 110, provided it maintains the records produced by station 110.

Fax station 110 generates a watermark value (74) by encrypting a value composed of attributes of the authentication occasion, e.g., when agent 15 requests a certified fax transmission and authenticates to sending station 110. In one example, sending station 110 concatenates a 64 bit value composed of this sequence: 24 bits to uniquely identify this user within entity 10's local directory's universe of users; 24 bits to represent the last 7 digits of the recipient's fax telephone number; 16 bits to represent the sending station 110's integer transmission counter value. In another example, the universe of users has been constrained to a maximum of 256 users who have been authorized by entity 10 to use sending station 110. In this second example, sending station 110 concatenates a 64 bit value composed of this sequence: 8 bits to uniquely identify the authorized user requesting this transmission; 34 bits to represent the last 10 digits of the fax telephone number; 6 bits to represent the country code of the fax telephone number using a unique code for 63 common countries and a general code to represent any uncommonly dialed country; and 16 bits to represent the sending station 110's integer transmission counter value. Other examples may be created similar to these which use values to represent the occasion of the fax transmission. After creating this occasion identifying value, the sending station 110 encrypts this value using a secret key and a symmetric cipher such as the Data Encryption Standard (DES), DESX, 3DES, CAST-128, Blowfish, or any other symmetric cipher that produces outputs in 64 bit blocks. An even wider variety of ciphers could be used, and a larger number of bits could be used to create the occasion identifier, however such methods introduce additional complexity in rendering the watermark as a visual overlay superimposed on the cover sheet and document image pages of the fax.

Following the computation of the 64 bit encrypted occasion identifier, the sending station 110 formats this value as a 64 bit hexadecimal number and sets this value into the fax template where its placeholder resides. This hexadecimal number may be formatted similarly to all other data fields. A digital signature of the 64 bit encrypted occasion identifier may computed, formatted, and inserted as a formatted value into the fax template where its placeholder resides.

Rendering the 64 bit encrypted occasion identifier value as a watermark within the constraints of a single page of a fax transmission is the first step to applying the watermark to all fax pages (76). The canvas of a standard resolution fax is 203×98 dots per inch (dpi), and a fine resolution fax is 203×196 dpi, and standard fax paper is 8.5"×11". Typically some vertical compression of the image is performed, allowing for a footer to be printed at the bottom of the page, and print often cannot extend beyond a 0.25" holdback space from the paper's edge on all sides. Dividing the paper into four logical non-overlapping quadrants, a 64 bit input can be graphed using four dots, one in each quadrant, such that each dot represents approximately 16 bits of the input. Those 16 bits of input can be graphed onto the paper the standard resolution fax with these paper constraints if a dot is plotted in one quadrant using an integer×coordinate for the low 8 bits of the partial input and an integer y coordinate for the high 8 bits of the partial input. Using this method, all four dots could be plotted within 513×513 pixels, or roughly a square approximately 2.5 inches on a side when using fine resolution. Additional examples could be produced, for example, one in which only one in two of the fax canvas's pixels in either direction was counted, thereby increasing the likelihood that a dot could be read correctly in the event of printing inaccuracies and increasing the size of the four quadrants to approximately a square approximately 5 inches on a side when using fine resolution. Using this method the dot size could also be increased thereby increasing visibility.

The sending station 110 superimposes the watermark's four quadrants, each with one dot, over the cover sheet and the fax document pages. In this manner, the watermark printed on the facsimile transmission comprises a graphical signature that is overlaid over the cover page and the content of the pages in the facsimile transmission. For each watermark dot, an XOR (exclusive OR) operation is performed, changing unset dots to set and vice versa in the fax image for every page. Following this page-by-page XOR operation with the watermark, a digital message digest value is computed over all of the fax pages in the current transmission, including the cover sheet, including the watermark on every page. The digital message digest may be computed using a digest algorithm such as the Secure Hashing Algorithm (SHA-1) or Message Digest 5 (MD5) or another secure digest algorithm. An advantage to computing the message digest after overlaying the graphical watermark signature over the original scanned content is that this message digest will be unique to this transmission of the scanned content inasmuch as the graphical watermark signature is unique because it contains a unique transaction counter and other values that have been encrypted with sending station 110's symmetric key. Therefore, it is highly unlikely that an attacker with access to the original scanned document could predict or forge this message digest value. This message digest (unsigned) is converted into a numerical format such as hexadecimal format and merged into the fax cover sheet document template. The sending station 110 signs the transmission using this message digest and the private key associated with the public key certificate associated with sending station 110 at entity 10. Following this computation, the message signature is converted into a hexadecimal number and merged into the fax cover sheet document template in a manner similar to all other data fields for the cover sheet. Alternatively, either signature may be converted into a format that can be scanned and readily interpreted as a number by a computer, for example, a set of two dimensional or a three dimensional bar code format.

Sending station 110 may use an alternate method for private-key-encrypting the overall transmission message digest value, and the encrypted 64 bit occasion identifier, such that it requests these operations as a network service from a server or service using private network 100. This method has the advantage that the private key associated with a public key certificate (such as those described in the Internet Engineering Task Force's Request For Comments 3280) may be stored in a secure and/or centralized location. In cases where theft of or unauthorized access to the private key stored in the sending station 110 is possible this method of requesting private-key-encryption is preferred.

After generating the cover sheet, the watermark and enhancing all of the fax document's pages with the superimposition of the watermark, the certified fax may be sent. Sending station 110 sends these fax pages to entity 20's receiving station 210, and performs any error handling or auditing as usual. Sending station may retain a record of the transmission, which may include the values included in the cover sheet and the exact facsimile pages transmitted after being overlaid with the graphical watermark signature.

Receiving station 210 may receive the facsimile transmission that includes the digital signature over the entire fax transmission, including the cover page and graphical watermark signature, and authenticate the sending entity. A verifying user (not shown) may obtain entity 10's public key certificate that matches the certificate number provided in the cover sheet, e.g., from a certificate authority, entity 20, its own records, etc. A verifying user may perform a cryptographic verify computation using the digital signature value and the public key certificate in order to authenticate entity 10 as the originator of the facsimile transmission. In this manner, the verifying user ensures that the computed verify value matches the overall transmission digest value on the face of the cover sheet and also that the matched public key certificate and entity name and address as registered to the purported sender matches the entity name on the cover sheet in order for the transmission to be considered authentic. After this verification, receiving entity 20 also has assurance that sending entity 10 cannot repudiate this transmission signed with its private key.

By performing this verification step, the graphical watermark signature can subsequently be inferred to be authentic, inasmuch as it would be very difficult to obtain the matching digital signature over the entire fax transmission value without all three of: the original scanned document, the symmetric key used to generate the graphical watermark pattern as overlaid in the same pattern on all facsimile pages, and the private key matching entity 10's public key certificate. Additionally, a verifying agent of entity 20 may verify the signed numerical value for the graphical watermark sent in the cover page using a cryptographic verify computation and entity 10's public key certificate obtained as described above. Once the graphical watermark has been validated, the watermark can be visually compared over all pages included in the facsimile transmission to verify that no sheets belonging to another transmission have been inadvertently added into the collection.

If sending entity 10 is later presented with the transmission and its graphical signature, entity 10 may easily locate any record of the facsimile transmission in sending station 110's transmission records using the graphical signature and the occasion identifier value on the cover sheet. Sending entity 10 can assure itself that it originated this facsimile transmission and that the contents were transmitted by one of its own agents by one of its own sending stations such as sending station 110 by verifying the digital signatures using its public key certificate. Further, the records kept by sending station 110 may also indicate which agent of entity 10 authenticated to sending station 110 in order to send the facsimile, that the transmission was intended for a telephone number related to entity 20, and that it was transmitted at a definite time known by both parties not before and not after other transmissions. Attempted forgeries of facsimile transmissions may be easily discovered by the sending entity, by comparing entity 10's record of the facsimile including the graphical signature included in the facsimile transmission with the transmission presented to entity 10. If the presented transmission and the record of the transmission differ in any way, the authentic transmission may be determined by recomputing either the digital signature or the digest value over the entire contents of the transmission with the graphical signature overlay, and comparing one or both of these values to the values displayed on the face of the cover sheet of the transmission presented to entity 10.

These and other embodiments are within the scope of the following claims.

The invention claimed is:

1. A method comprising:
   authenticating a sender of a facsimile transmission to be sent;
   generating a graphical signature for the facsimile transmission; and
   generating the facsimile transmission to include the graphical signature, wherein generating the facsimile transmission to include the graphical signature comprises generating a pattern of dots relative to one or more two-dimensional coordinate systems, and overlaying the pattern of dots over content of the facsimile transmission.

2. The method of claim 1, wherein generating the facsimile transmission further includes generating a cover sheet to include the graphical signature.

3. The method of claim 1, further comprising sending the facsimile transmission.

4. The method of claim 1, wherein authenticating the sender comprises authenticating the sender in a private network associated with a facsimile machine as being authorized to send the facsimile transmission.

5. The method of claim 1, wherein the graphical signature is derived by the sender from a key value known confidentially by the sender and values that uniquely identify the facsimile transmission.

6. A method comprising:
   authenticating a sender of a facsimile transmission to be sent;
   generating a graphical signature for the facsimile transmission; and
   generating the facsimile transmission to include the graphical signature, wherein generating the facsimile transmission further includes generating a cover sheet to include the graphical signature, and wherein generating the cover sheet to include the graphical signature comprises overlaying the pattern of dots on the cover sheet.

7. A method comprising:
   authenticating a sender of a facsimile transmission to be sent;
   generating a graphical signature for the facsimile transmission; and
   generating the facsimile transmission to include the graphical signature, wherein generating the facsimile transmission further includes generating a facsimile cover sheet to include the graphical signature, and wherein generating the facsimile cover sheet comprises generating values that pertain to the facsimile transmission and inserting the values into the facsimile cover sheet.

8. The method of claim 7, wherein generating the values includes reformatting the graphical signature as a formatted numerical value, computing a digital signature for the formatted numerical value, and inserting the formatted numerical value and the digital signature into the cover sheet.

9. The method of claim 7, wherein generating the values includes computing a message digest of the facsimile transmission overlaid with the graphical signature, creating a digital signature by digitally signing the digest, and inserting the message digest and the digital signature into the cover sheet as formatted values.

10. The method of claim 1, further comprising storing a record of the facsimile transmission with a record of the graphical signature.

11. The method of claim 10, further comprising allowing access to the record of the graphical signature by a recipient to allow the recipient to verify the graphical signature on the facsimile transmission relative to the record of the graphical signature.

12. A facsimile system configured to:
   authenticate a sender of a facsimile transmission to be sent;
   generate a graphical signature for the facsimile transmission; and
   generate the facsimile transmission to include the graphical signature, wherein in generating the graphical signature, the facsimile system generates a pattern of dots relative to one or more two-dimensional coordinate systems, and overlays the pattern of dots over content of the facsimile transmission.

13. A non-transitory computer readable medium comprising instructions that upon execution in a facsimile system cause the facsimile system to:
   authenticate a sender of a facsimile transmission to be sent;
   generate a graphical signature for the facsimile transmission; and
   generate the facsimile transmission to include the graphical signature, wherein in generating the graphical signature, the instructions upon execution cause the facsimile system to generate a pattern of dots relative to one or more two-dimensional coordinate systems, and overlay the pattern of dots over content of the facsimile transmission.

14. A method comprising:
   receiving a facsimile transmission, the facsimile transmission including a cover sheet, a digital signature and a graphical signature; and
   authenticating the facsimile transmission based on the cover sheet, the digital signature, the graphical signature, and a public key certificate, wherein the graphical signature comprises a pattern of dots relative to one or more two-dimensional coordinate systems, and wherein the facsimile transmission comprises content with the pattern of dots overlaid over the content.

15. The method of claim 14, wherein the facsimile transmission further comprises a cover sheet with the pattern of dots.

16. The method of claim 15, wherein authenticating the facsimile transmission includes comparing the pattern of dots on the cover sheet to the pattern of dots overlaid over the content.

17. The method of claim 14, wherein authenticating the facsimile transmission includes comparing the graphical signature included in the facsimile transmission to a verified copy of the graphical signature.

18. A facsimile system configured to:
   receive a facsimile transmission, the facsimile transmission including a cover sheet, a digital signature and a graphical signature; and
   authenticate the facsimile transmission based on the cover sheet, the digital signature, the graphical signature, and a public key certificate, wherein the graphical signature comprises a pattern of dots relative to one or more two-dimensional coordinate systems, and wherein the facsimile transmission comprises content with the pattern of dots overlaid over the content.

19. A non-transitory computer readable medium comprising instructions that upon execution in a facsimile system cause the facsimile system to:
   receive a facsimile transmission, the facsimile transmission including a cover sheet, a digital signature and a graphical signature; and
   authenticate the facsimile transmission based on the cover sheet, the digital signature, the graphical signature, and a public key certificate, wherein the graphical signature comprises a pattern of dots relative to one or more two-dimensional coordinate systems, and wherein the facsimile transmission comprises content with the pattern of dots overlaid over the content.

20. The facsimile system of claim 18, wherein the facsimile transmission further comprises a cover sheet with the pattern of dots, and wherein the facsimile system authenticates the facsimile transmission by comparing the pattern of dots on the cover sheet to the pattern of dots overlaid over the content.

21. The computer-readable medium of claim 19, wherein the facsimile transmission further comprises a cover sheet with the pattern of dots, and wherein the instructions when executed authenticate the facsimile transmission by comparing the pattern of dots on the cover sheet to the pattern of dots overlaid over the content.

22. A facsimile system configured to:
  authenticate a sender of a facsimile transmission to be sent;
  generate a graphical signature for the facsimile transmission; and
  generate the facsimile transmission to include the graphical signature, wherein generating the facsimile transmission further includes generating a cover sheet to include the graphical signature, and wherein generating the cover sheet to include the graphical signature comprises overlaying the pattern of dots on the cover sheet.

23. A non-transitory computer readable medium comprising instructions that upon execution in a facsimile system cause the facsimile system to:
  authenticate a sender of a facsimile transmission to be sent;
  generate a graphical signature for the facsimile transmission; and
  generate the facsimile transmission to include the graphical signature, wherein generating the facsimile transmission further includes generating a cover sheet to include the graphical signature, and wherein generating the cover sheet to include the graphical signature comprises overlaying the pattern of dots on the cover sheet.

24. A facsimile system configured to:
  authenticate a sender of a facsimile transmission to be sent;
  generate a graphical signature for the facsimile transmission; and
  generate the facsimile transmission to include the graphical signature, wherein generating the facsimile transmission further includes generating a facsimile cover sheet to include the graphical signature, and wherein generating the facsimile cover sheet comprises generating values that pertain to the facsimile transmission and inserting the values into the facsimile cover sheet.

25. A non-transitory computer readable medium comprising instructions that upon execution in a facsimile system cause the facsimile system to:
  authenticate a sender of a facsimile transmission to be sent;
  generate a graphical signature for the facsimile transmission; and
  generate the facsimile transmission to include the graphical signature, wherein generating the facsimile transmission further includes generating a facsimile cover sheet to include the graphical signature, and wherein generating the facsimile cover sheet comprises generating values that pertain to the facsimile transmission and inserting the values into the facsimile cover sheet.

* * * * *